Feb. 20, 1951 R. GLASER 2,542,507
APPARATUS FOR COPYING BY MEANS OF MACHINE TOOLS
Original Filed March 13, 1943
3 Sheets-Sheet 1
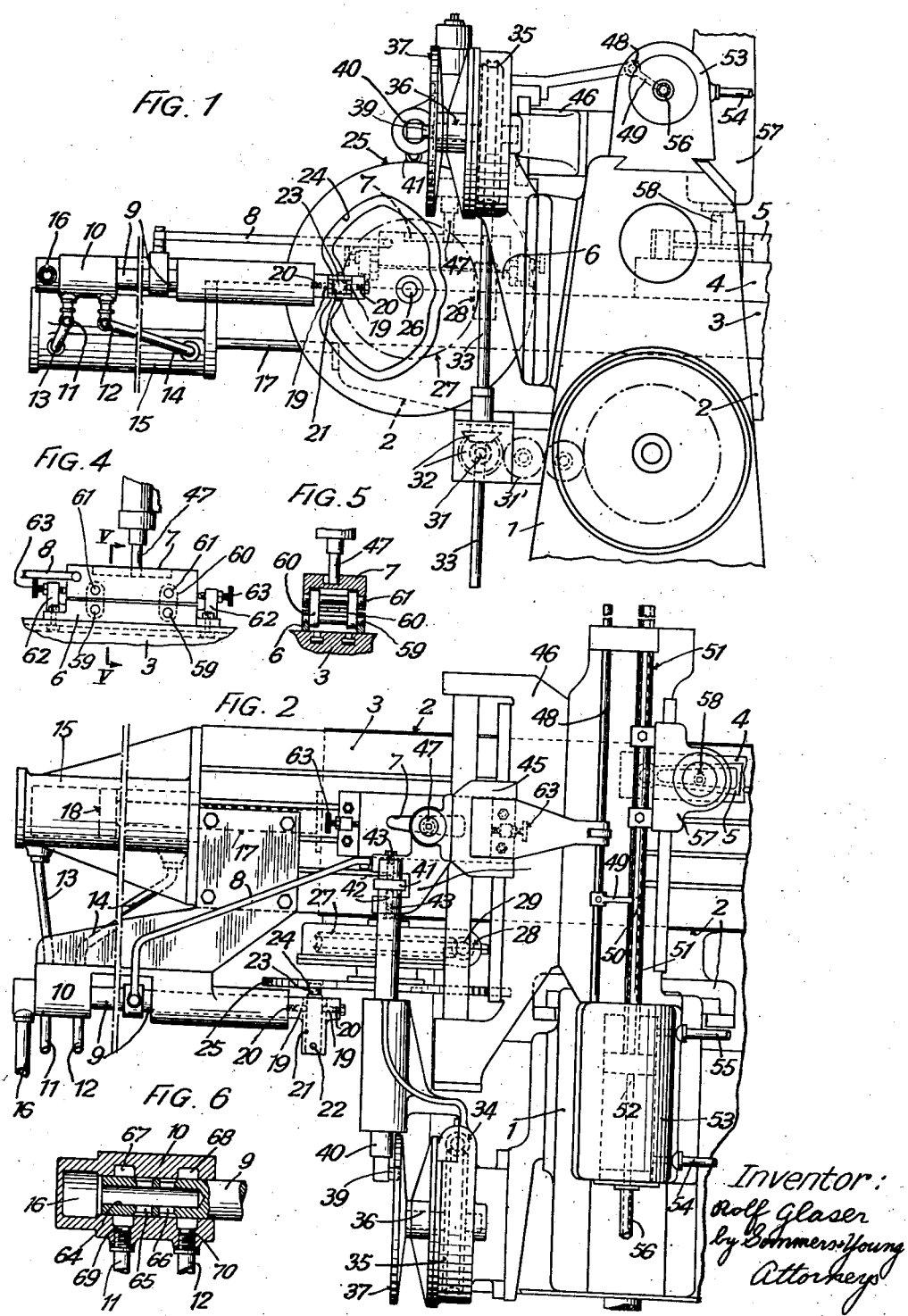
Inventor:
Rolf Glaser
by Sommers & Young
Attorneys

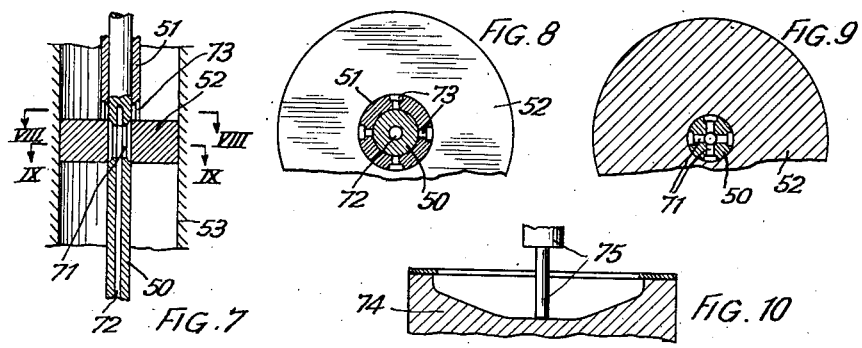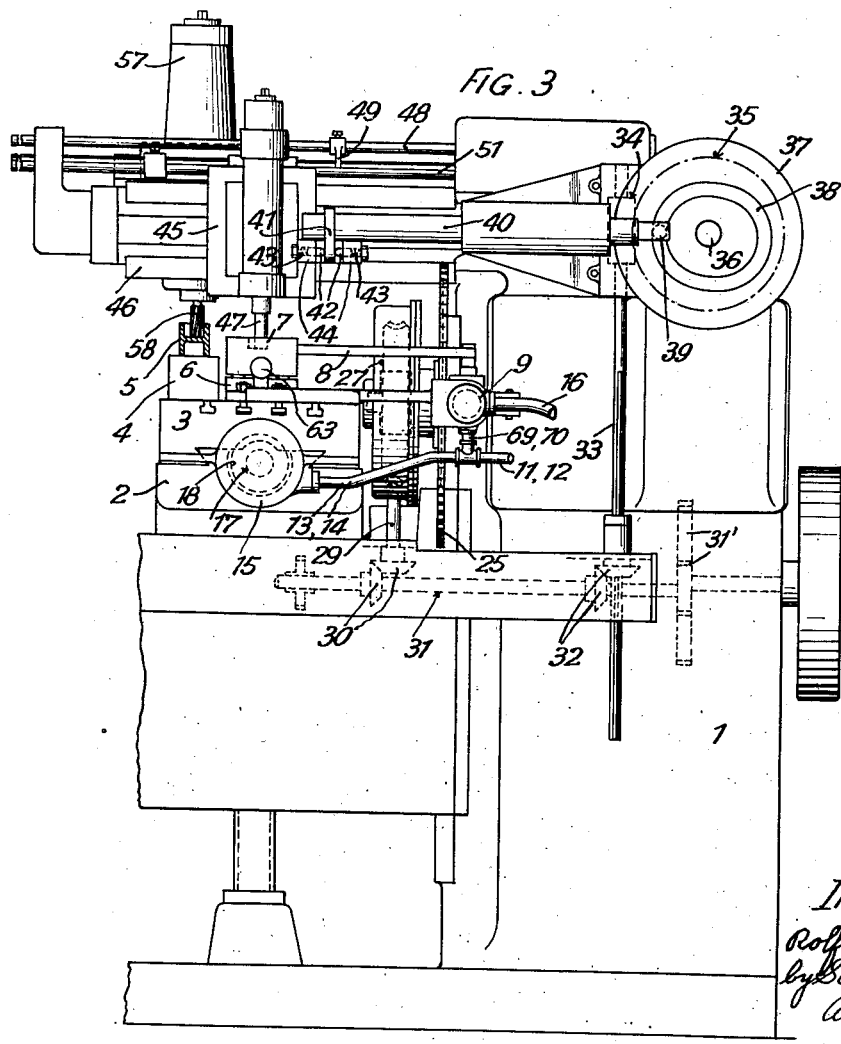

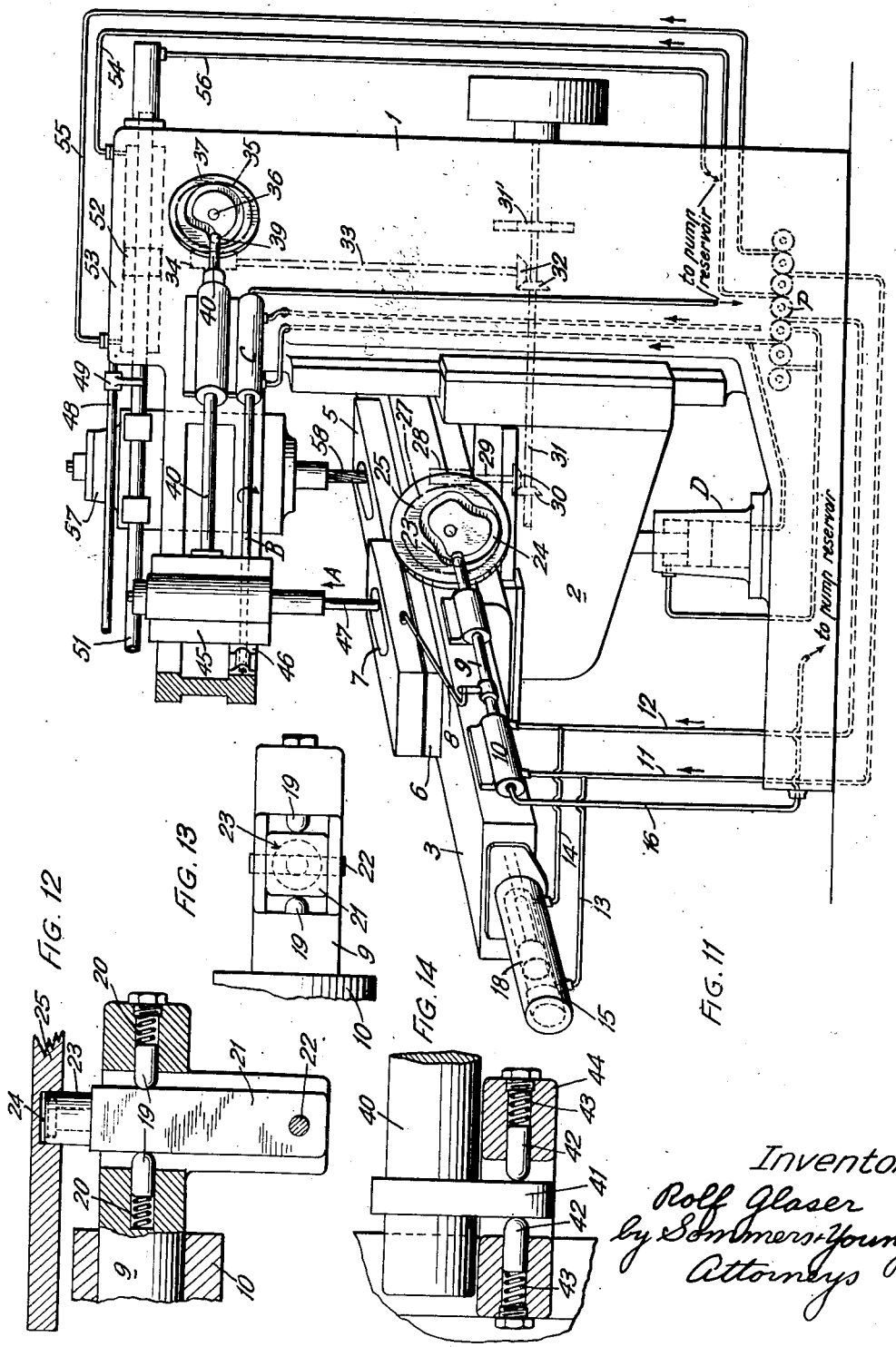

Patented Feb. 20, 1951

2,542,507

UNITED STATES PATENT OFFICE 2,542,507

APPARATUS FOR COPYING BY MEANS OF MACHINE TOOLS

Rolf Glaser, Rorschach, Switzerland, assignor to Rigid Limited, Rorschacherberg, Switzerland Substituted for abandoned application Serial No. 479,104, March 13, 1943. This application September 11, 1947, Serial No. 773,453. In Switzerland January 8, 1942

Section 1, Public Law 690, August 8, 1946
Patent expires January 8, 1962

3 Claims. (Cl. 90—13.5)

The present invention relates to a method of and apparatus for copying, by means of machine tools which operate under the control of control templates or patterns in accordance with a coordinate system, for actuating the slide drives of the machine tool for feeding the tool in at least two directions of said coordinate system.

Copying apparatus of this kind are known in which the tracers are urged against the control patterns by hydraulically operated actuating plungers for the slide drives. In such arrangements the pressure at which the tracers are urged against the control patterns is obviously very large, so that the control patterns must be made of very hard and extremely tenacious material, which is difficult to work, and nevertheless wear down prematurely. Furthermore, the drawback ensues that on regrinding the tool the control patterns must be correspondingly altered in order to obtain accurate form of the work.

These drawbacks are eliminated by means of the method and apparatus according to the present invention.

The apparatus according to the invention is characterized by tracer means cooperating with associated control patterns for feeding the working tool in two directions of the coordinate system, hydraulic slide drives actuated by control slide valves controlled from said tracers, and a master tracer cooperating with an original pattern, said original pattern having a form and size conforming to the true copy form of the work to be produced, for controlling said slide valves supplementarily to the control thereof by said control patterns.

In the apparatus for carrying the method into effect tracers controlled by the control patterns cooperate with control slide valves for hydraulic slide drives so as to require a relatively small pressure of the tracer upon the control patterns and allowing the use of control patterns that can be easily worked and are less susceptible to wear. Further an original pattern having a form and size exactly conforming to the measurements prescribed for the work to be machined is provided in association with a master tracer for influencing the control slide valves also. The control patterns can be made, for example of unhardened thin steel sheet metal which can be easily worked.

A further advantageous construction of such a copying apparatus consists in that the control patterns are arranged to cooperate with the control slide valve in elastically resilient manner and are so constructed as to impart to the tool holder and to the holder of the master tracer a travel in excess of that required for the form to be produced in connection with which the control slide valves are so influenced by the original pattern and cooperative master tracer, that the excess travel cannot have a detrimental influence on the form of the work, but is provided for the purpose of permitting regrinding the tool in an amount corresponding to the surplus travel without impairing the copying operation. By this means the control patterns which are relatively difficult to be produced, and must have a certain relationship to each other in regard to form need not be worked into exactly true form as functioning merely to effect the slide feed. Moreover, if wear on the tool occurs all that is necessary to be done is to alter the master tracer, while the control patterns remain unchanged.

In the accompanying drawings, an embodiment of the invention is illustrated by way of example only, in which.

Fig. 1 shows an elevation of a copying apparatus according to the invention in connection with a milling machine;

Fig. 2 is a top plan view of Fig. 1; and

Fig. 3 shows a side elevation thereof;

Fig. 4 is an elevational view of the original pattern inclusive of the carrier thereof and the master tracer;

Fig. 5 is a section on the line V—V of Fig. 4;

Fig. 6 is a section of a casing including a cylindrical guide for the control means for effecting the movement of the longitudinal slide;

Fig. 7 is a section of a cylinder for effecting and controlling the cross slide;

Figs. 8 and 9 represent sections on the respective lines VIII—VIII and IX—IX in Fig. 7;

Fig. 10 is a section through the original pattern and cooperative master tracer for three-dimensional control of the slide drives;

Fig. 11 shows an elevation partially drawn in perspective of the present copying machine in combination with a device for controlling vertical copying movements as disclosed in the U. S. A. Patent No. 2,250,241; and Figs. 12, 13 and 14 are views of details of the present copying machine.

On a supporting member 2 which is vertically displaceably guided on the standard 1 of the present milling machine a longitudinal slide 3 is horizontally guided. On this slide is arranged a support 4 for the work 5. Further, on the longitudinal slide 3 a carrier 6 for an original pattern 7 is arranged, the form and size of which pattern exactly conforms to the surface of the work 5 to be machined. The pattern 7 coacts with a master tracer 47. On the carrier 6, on both ends of each of two pins 59, a link 60 is mounted (Figs. 4, 5) which links are further mounted on two associated pins 61 in the original template 7 and by which means the original pattern 7 is longitudinally arranged for horizontal movement in either direction which movement will be produced if the tracer 47 contacts the pattern 7. By two stop screws 63 that are screwed into projections 62 on the carrier 6 the range of longitudinal movement of the original pattern 7 is restricted to a short distance in either direction of movement. This short distance corresponds always exactly to the respective required control movement of a double acting control slide valve 9 hereinafter described. This valve which is horizontally movable and extends into a casing 10, is connected for its actuating with the original pattern 7 through a connecting member or rod 8. When the original pattern 7 due to coaction with the master tracer 47 is moved relative to the carrier 6 the slide valve 9 is correspondingly moved. By this means the double acting slide valve 9 is influenced to perform relative movements originating from a control pattern 25. The portion of the control slide valve 9 extending into the casing 10 is provided with a control bore 64 and control slots 65, 66 (Fig. 6) which cooperate with annular spaces 67, 68 in the slide valve casing 10 for controlling a pressure fluid. The spaces 67, 68 communicate with pipe connections 69, 70 for the reception of pressure fluid conduits 11, 12. The bore 64 of the valve 9 communicates with a discharge conduit 16. The other ends of the pipes 11, 12 are connected to a pump system generally designated by P.

A cylinder 15 is secured to the longitudinal slide 3 (Fig. 2) and the piston rod 17 of a double acting piston 18, which is contained in the cylinder 15, is fixed to the supporting member 2. By a control movement of the control slide valve 9 in one or the other direction pressure fluid will flow from the respective annular space 67 or 68 through the corresponding control slots 65 or 66 into the discharge conduit 16, whereby the pressure fluid in the pressure conduits concerned and also the respective ends of the piston are relieved of pressure. By this means the cylinder 15 and thus the longitudinal slide 3 is correspondingly adjusted until the control slots 65, 66 of the slide valve 9 assume a symmetrical disposition to the annular spaces 67, 68 again. Due to the connecting rod 8 the pattern 7 lies in this position in the middle between the stop screws 63.

In the slide valve control rod 9 are fastened two bolts 19 which are influenced by springs 20 for acting from both sides upon a pivotal arm 21 which is swingably mounted on a pin 22 extending through said rod (Figs. 12 and 13) and carries at its free end a tracer roller 23 which engages into a cam groove 24 in a control pattern 25. Consequently the control slide valve for the longitudinal movement is elastically resiliently connected with the tracer cooperating with the curved groove 24 in the control pattern 25, which tracer is constituted by the roller 23. The purpose of the elastic connection is to permit exact control or supervision by means connected with the original pattern 7. A shaft 26 on which this pattern is mounted further carries a worm wheel 27 which is driven by a ratio gearing (31'), which is arranged in the supporting member through the intermediary of a worm 28, a shaft 29, a bevel gear transmission gearing 30 and a shaft 31.

From the same shaft 31, via bevel gears 32, a shaft 33, which is extensible in the manner of a telescopic shaft, is driven as well as a worm wheel 35 via a worm 34, the worm wheel being carried by a stub shaft 36 in common with a second control pattern 37. By this means the two control patterns 25, 37 are positively coupled together so as to turn at the same speed, so that to any point of the cam groove of one control pattern a certain point of the cam groove of the other control pattern corresponds. With the cam grooves 38 of the control pattern 37 (Fig. 3) cooperates a tracer roller 39 which is mounted on a transversely displaceable rod 40 which carries a projection 41 the two sides of which are each acted upon by bolts 42. These two bolts 42, each of which is influenced by a spring 43 (Fig. 14), are mounted in a forked portion 44 of a roller supported carriage 45 which is transversely displaceably guided by a cantilever arm 46 of the machine standard 1. On this carriage 45 the master tracer 47 cooperating with the original pattern 7 is arranged. The roller supported carriage 45 is further connected with a rod 48 which is fastened by means of a connecting member 49 to a slide valve actuating rod 50.

The rod 50 is arranged within a hollow piston rod 51 (Fig. 2) which is provided with a longitudinal slot into which the member 49 projects. The piston rod 51 is connected to a piston 52 which is arranged within a cylinder 53 and with which cooperates the slide valve actuating rod 50 which to this end is provided with control slots 71 which communicate with a bore 72 of the rod 50 (Figs. 7 and 9). With the bore 72 communicates the discharge conduit 56 for the pressure fluid which is conducted toward both ends of the piston 52 through conduits 54, 55. This hollow piston rod 51 is further provided with slots 73 (Fig. 8), which permit of the pressure fluid being conducted toward the slide valve actuating rod 50 or the control slots 71 on the respective piston side. In adjusting the slide valve actuating rod 50 in one or other direction pressure fluid is discharged on the respective side of the piston through the control slots 71, bore 72, and discharge conduit 56, so that the end of the piston concerned is relieved and the piston adjusted until it is symmetrically disposed to the control slots 71 in the valve actuating rod 50 again.

The piston rod 51 is connected with the transverse slide 57 on which the tool 58 in the form of a cylindrical milling cutter serving for the machining of the work 5 is arranged. The diameter of the master tracer 47 is equal to that of the tool 58. On regrinding of the tool 58, therefore, exclusively a master tracer 47 of correspondingly smaller diameter must be used in order to obtain a work piece of exactly the same form as the original pattern 7.

The control pattern 25 serves for controlling the slide 3 and the control pattern 37 for controlling the slide 57.

The two control patterns 25, 37 are so formed that the master tracer 47 is automatically guided longitudinally of the original pattern and is at all times urged against the latter substantially at the same pressure, while the tracer roller which is influenced by the control pattern 25, resiliently cooperates with the original pattern 7 and the tracer roller 39 influenced by the control pattern cooperates with the master tracer 47.

The obtainment of a substantially uniform pressure at which the master tracer 47 bears against the original pattern 7 is due to the surplus travel being evenly distributed to the control curves 25 and 37. This travel is actually caused by forcible expansion of the resilient transmission system which is intercalated between the original pattern and the work piece. It will be observed, that the travel which the tracer rollers 23, 39 perform by influence of the control curves 25, 37 is greater than the throw of the slides 3 and 57 actuated by said curves. The surplus travel performed at the control curves 25 and 37 would cause the milled form to increase in size provided that no means for preventing this were arranged.

Such means may consist of two bolts 42 which are arranged on the carriage 45 and bear against the projection 41 on the displaceable rod 40 from both sides by action of the spring 43. In this way an elastically resilient connection is provided between the carriage 45 and the roller 39. Due to this provision the surplus travels of the control patterns have no influence on the form to be milled, because of the presence of a resilient connection between the carriage 45 and the displaceable rod 40. In the absence of an original pattern, the curved tracks of the control patterns 25 and 37, which tracks operate so as to perform surplus travels and are coordinated with each other, would encompass the contour of the model to be copied with a certain uniform clearance that is, the size of the work piece would become too great.

However, when the master tracer 47 bears against the original pattern 7 in the longitudinal and the transverse direction as well, the surplus travel of the control curves 25 and 37 (surplus travel in regard to the original pattern) is compensated by action of the resilient mounting of the tracer rollers 23 and 39 (eliminated without the possibility of being transmitted to the master tracer 47). Depending upon the position of the master tracer in the original pattern, the direction of the displacing movement of the slides 3 and 57 can be controlled by one or the other control curve or it may happen that both control curves perform surplus travels at the same time. Since the master tracer 47 is prevent from transgressing the limit of the interior of the original pattern 7, but is urged against the form of the original pattern at a small constant pressure at all times, equality of size of the original pattern and of the work piece is obtained. This is due to the fact that first the described resilience of connection between the rod 40 and the carriage 45 is realized by the pressure of the spring-pressed bolts 42 and, secondly the same condition exists at the lever arm 21 which also is subjected to spring pressure. In spite of this the original pattern controls the control slide inclosed in the casing 10, since the carrier 6 of the original pattern 7 is adapted to perform a small limited movement relative to the slide 3 and is connected by the rod 8 with the slide valve actuating rod 9. By means of the connecting rod 8 an adjusting operation of the slide valve actuating rod 9 is effected in the casing 10, when the tracer 47 touches the original pattern 7 in the longitudinal direction while the control pattern 25 performs a surplus travel relative to the original pattern by action of the curve 24, through the roller 23 being resiliently connected to the original pattern.

The described effect is obtained, when controlling of the slide 3 takes place by cooperation of the control slide valve actuating rod 9 with the control curve 25, while the slide 3 moves for example to the left. The rod 8 pulls the original pattern carrier 6 in the same direction into the left-hand position of the limited range. When surplus movement arises, the roller 23 urges the left-hand spring 20 together with the slide resiliently towards the left, until the tracer 47 rides upwards towards the right-hand end of the original pattern 7, so that the relative movement of the carrier 6 is transmitted to the slide valve control rod 9 via the rod 8. By this means, the fluid flow in the casing 10 and that in the pressure supply pipes 11 and 12 are regulated. Without this relative movement of the carrier 6 compensation of the surplus movement of the pattern 25 relative to the original pattern would be impossible.

In effecting transverse control by the slide 57, the resiliently mounted stop 41 on the slide valve actuating rod 40 has an analogous function with respect to the master tracer, because in this case the carriage 45 associated with the tracer 47 moves towards the original pattern and the slide 3 is arrested in the transverse plane thereof, so that the surplus movement of the control curve 37 relative to the roller 39, directly influences the springs 42 and 43. The master tracer thus actually bears constantly against the form of the original pattern, thereby to control the control slide valve exclusively commensurate with these dimensions. The influencing of the control slide valves by the master tracer is possible without affecting the tracers 23, 39, and the curved grooves of the control slide pattern 25, 37, due to the presence of the springs 20 and 43. Surplus movement is provided for making it possible to effect copying also with a resharpened tool without the necessity of altering the curved grooves, the resharpening being possible up to an amount corresponding to the extent of surplus movement.

The original pattern 7 defines the accurate form of the work piece to be trimmed, so that there is no necessity for machining the control patterns 25, 37 into accurate form, because the resilient connection compensates all inaccuracies. Further due to the employment of double acting control slide valves, which obviously consume only a fraction of the driving power required by the slides, the pressure exerted on the patterns by the tracers in relatively small, for example only about 2 kg., so that the control patterns can be made of unhardened, thin steel sheet metal which can easily be worked. Furthermore, the original pattern can be manufactured with ease and can be conveniently altered, if required.

In Fig. 11 of the drawings, showing the present milling machine in combination with a vertical copying device, the reference numerals used correspond to those employed in the other figures. In this schematically indicated old matter, relating to a vertical copying device, as disclosed in the U. S. A. Patent No. 2,250,241, only the essential parts have been generally designated, as follows.

The character A denotes the direction of the control impulses resulting from the movement of the tracer 47 by cooperation of the latter with the original pattern 7. These impulses are transmitted to the control system C of the device through a shaft B which performs corresponding rotational movements. A pressure fluid system D which is associated with the control system operates to transmit the vertical impulses effected by the tracer to the supporting member 2 and thus to the slide 3 and to the original pattern 7 secured to said slide.

This application is a substitute for my application Serial No. 479,104, filed on March 13, 1943, now abandoned.

I claim:

1. Apparatus for copying a pattern by machine tools comprising, a pattern having roughly the general shape of the work desired to produce, a feeler for engaging said rough pattern to be moved thereby, a tool for shaping a work piece, connection means between said feeler and said tool for imparting movement to the tool, said connection means including elastic means for allowing minor deviations of the tool movements from the guidance imparted by the said feeler, a second pattern having a shape more exactly corresponding to the desired shape of the work to be produced, a second feeler for engaging the second pattern to be guided thereby, and motion transmitting means connected with the tool for superimposing a control on the motion imparted thereto from the first pattern and its feeler to cause the tool to move with more exactness with respect to the shape to be given the work, whereby the greater amount of wear on the patterns occurs on the said roughly shaped pattern.

2. A copying machine tool, comprising a first slide carrying the workpiece and movable in one direction, a second slide carrying the tool and movable in a second direction, hydraulic slide drives for driving the two slides, control slide valves for controlling the said hydraulic slide drives, a first control pattern having a shape conforming to the movement of the first slide, a first control tracer engaging the said first control pattern, elastically yielding connection means between the first control tracer and the slide valve of the first slide, a second control pattern having a shape conforming to the movement of the second slide, a second control tracer engaging the said second control pattern, elastically yielding connection means between the second control tracer and the slide valve of the second slide, an original pattern having a shape conforming exactly to the true copy of the workpiece to be produced and arranged on the said second slide, and connection means between the original pattern and the control slide valve of the first slide and between the master tracer and the control slide valve of the second slide.

3. A copying machine tool, comprising a longitudinal slide carrying the workpiece, a transverse slide carrying the machine tool, hydraulic slide drives for driving the longitudinal and the transverse slides, control slide valves for controlling the said hydraulic slide drives, a first control pattern having a shape conforming to the movement of the longitudinal slide, a first control tracer engaging the said first control pattern, elastically yielding connection means between the first control tracer and the slide valve of the longitudinal slide, a second control pattern having a shape conforming to the movement of the transverse slide, a second control tracer engaging the said second control pattern, elastically yielding connection means between the second control tracer and the slide valve of the transverse slide, an original pattern having a shape conforming exactly to the true copy of the workpiece to be produced and arranged on the said transverse slide, and connection means between the original pattern and the control slide valve of the longitudinal slide and between the master tracer and the control slide valve of the transverse slide.

ROLF GLASER.

REFERENCES CITED

The following references are of record in the file of this patent:

UNITED STATES PATENTS

| Number | Name | Date |
|---|---|---|
| 1,924,003 | Shaw | Aug. 22, 1933 |
| 2,036,362 | Sassen | Apr. 7, 1936 |
| 2,250,241 | Thalmann | July 22, 1941 |
| 2,372,427 | Johnson | Mar. 27, 1945 |

FOREIGN PATENTS

| Number | Country | Date |
|---|---|---|
| 284,148 | Great Britain | Jan. 26, 1928 |
| 320,280 | France | Apr. 8, 1902 |
| 571,551 | Germany | Mar. 7, 1933 |